United States Patent
Irlin

(10) Patent No.: US 10,406,611 B1
(45) Date of Patent: Sep. 10, 2019

(54) CUTTING TOOL AND CUTTING INSERT HAVING COMPLEMENTARY ENGAGEMENT FEATURES FOR ECCENTRIC MOUNTING

(71) Applicant: Iscar, Ltd., Tefen (IL)

(72) Inventor: Sergey Irlin, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/938,020

(22) Filed: Mar. 28, 2018

(51) Int. Cl.
*B23C 5/06* (2006.01)
*B23C 5/22* (2006.01)

(52) U.S. Cl.
CPC .............. *B23C 5/2221* (2013.01); *B23C 5/06* (2013.01); *B23C 2200/0461* (2013.01); *B23C 2200/08* (2013.01); *B23C 2200/16* (2013.01); *B23C 2200/286* (2013.01); *B23C 2210/165* (2013.01); *B23C 2210/168* (2013.01); *B23C 2210/208* (2013.01)

(58) Field of Classification Search
CPC .......... B23C 5/2221; B23C 5/08; B23C 5/06; B23C 5/2247; B23C 9/00; B23C 2200/161; B23C 2200/16; B23C 2210/168
See application file for complete search history.

(56) References Cited

U.S. PATENT DOCUMENTS

| | | | |
|---|---|---|---|
| 5,275,633 A | 1/1994 | Johansson et al. |
| 5,383,750 A | 1/1995 | Satran et al. |
| 6,921,233 B2 | 7/2005 | Duerr et al. |
| 6,929,428 B1 | 8/2005 | Wermeister et al. |
| 7,073,987 B2 | 7/2006 | Hecht |
| 7,090,443 B2 | 8/2006 | Hecht et al. |
| 7,300,232 B2 | 11/2007 | Wiman et al. |
| 7,604,441 B2 | 10/2009 | Bhagath |
| 8,905,683 B2 | 12/2014 | Satran et al. |

(Continued)

FOREIGN PATENT DOCUMENTS

JP 2013-078828 5/2013

OTHER PUBLICATIONS

International Search Report dated Jun. 18, 2019, issued in PCT counterpart application (No. PCT/IL2019/050237).

(Continued)

*Primary Examiner* — Willmon Fridie, Jr.

(74) *Attorney, Agent, or Firm* — Womble Bond Dickinson (US) LLP

(57) ABSTRACT

A cutting tool has a cutting body with a first insert pocket and an indexable cutting insert removably mounted therein. The first insert pocket has a first seat surface with a plurality of first engagement elements and a first support wall transverse thereto. The cutting insert has upper and lower surfaces and a boundary surface extending therebetween. The lower surface has a plurality of lower engaging elements and the boundary surface has a plurality of alternating first and second peripheral surfaces intersecting the upper surface to form first and second upper cutting edges. In each index position with the lower surface in contact with the first seat surface, the first support wall prevents translation of the cutting insert in a first direction, and the first engagement elements eccentrically contact the lower engaging elements to prevent translation of the cutting insert in a second direction perpendicular to the first direction.

28 Claims, 9 Drawing Sheets

(56) References Cited

U.S. PATENT DOCUMENTS

| | | | |
|---|---|---|---|
| 2005/0063792 A1* | 3/2005 | Satran | B23C 5/1072 407/113 |
| 2006/0045636 A1* | 3/2006 | Johnson | B23C 5/06 407/42 |
| 2007/0248425 A1* | 10/2007 | Andersson | B23C 5/06 407/113 |
| 2008/0181731 A1 | 7/2008 | Wallstrom et al. | |
| 2009/0249607 A1* | 10/2009 | Kadosh | B23C 5/08 29/468 |
| 2010/0150670 A1 | 6/2010 | Hecht | |
| 2011/0103905 A1* | 5/2011 | Morrison | B23C 5/2213 407/48 |
| 2013/0051936 A1* | 2/2013 | Satran | B23C 5/08 407/42 |
| 2013/0129432 A1* | 5/2013 | Jaeger | B23C 5/207 407/42 |
| 2013/0216319 A1* | 8/2013 | Michelet | B23C 5/08 407/48 |
| 2014/0030038 A1 | 1/2014 | Hansson | |
| 2014/0086696 A1* | 3/2014 | Fang | B23C 5/2221 407/99 |
| 2014/0314509 A1* | 10/2014 | Yamamichi | B23C 5/207 409/132 |
| 2015/0016900 A1 | 1/2015 | Jansson | |
| 2015/0190868 A1* | 7/2015 | Koifman | B23C 5/207 407/11 |
| 2017/0014920 A1* | 1/2017 | Fang | B23C 5/2221 |
| 2018/0345389 A1* | 12/2018 | Selio | B23C 5/06 |

OTHER PUBLICATIONS

Written Opinion dated Jun. 18, 2019, issued in PCT counterpart application (No. PCT/IL2019/050237).

* cited by examiner

CUTTING TOOL AND CUTTING INSERT HAVING COMPLEMENTARY ENGAGEMENT FEATURES FOR ECCENTRIC MOUNTING

FIELD OF THE INVENTION

The present invention relates to a cutting tool having an eccentrically mounted cutting insert for use in metal cutting processes, in general, and to rotary cutting tools having a plurality of eccentrically mounted cutting inserts for use in slotting operations, in particular.

BACKGROUND OF THE INVENTION

Within the field of rotary cutting tools used in slotting operations, there are many examples of cutting inserts removably mounted in insert receiving pockets which are 'open' in both axially forward and rearward directions.

U.S. Pat. No. 7,090,443 discloses a slotting tool comprising an insert holder in the form of a circular disc with a plurality of non-indexable cutting inserts removably retained in identical insert pockets arranged around the periphery of the disc. Each cutting insert has a through bore with a retaining screw passing therethrough and engaging a threaded bore in the associated insert pocket. Lateral stability of each cutting insert relative to the insert holder is provided by the lower and rear surfaces of the cutting insert having generally V-shape concave (or convex) cross sections, which mate corresponding generally V-shape convex (or concave) cross sections of the lower and rear abutment surfaces of the associated insert pocket.

U.S. Pat. No. 8,905,683 discloses a rotary cutting tool comprising a tool body having a plurality of seating surfaces adjacent a forward facing end surface, and an equal number of indexable cutting inserts removably secured therein. Each cutting insert is oriented on its respective seating surface such that only a single abutment portion of one its four flank surfaces is in abutting contact with a radially outward facing support surface on the tool body, and there are no other points or regions of abutting contact between the insert's peripheral side surface and the cutting body. Each cutting insert has a non-circular clamping bore and a rigid clamping screw passing therethrough which engages a threaded bore in the associated seating surface. A non-threaded portion of the clamping screw simultaneously applies four clamping forces at four operative clamping portions of the non-circular clamping bore to provide axial support for the cutting insert.

SUMMARY OF THE INVENTION

In accordance with the present invention, there is provided a cutting tool comprising a tool body having a first insert receiving pocket and an indexable cutting insert removably mounted therein:

the first insert receiving pocket comprising a first seat surface and a first support wall transverse thereto, the first seat surface having a plurality of male or female first engagement elements; and the cutting insert comprising opposing upper and lower surfaces and a continuous boundary surface extending therebetween, the boundary surface having a plurality of N1 first peripheral surfaces circumferentially alternating with a plurality of N1 second peripheral surfaces, each first peripheral surface intersecting the upper surface to form a first upper cutting edge, and each second peripheral surface intersecting the upper surface to form a second upper cutting edge, and the lower surface having a plurality of discrete, spaced apart female or male lower engaging elements, wherein the cutting insert is indexable about a first axis passing through the upper and lower surfaces, and a median plane perpendicular to the first axis intersects the boundary surface, wherein the cutting insert has N1 index positions with the lower surface in contact with the first seat surface, and in each index position:

the first support wall contacts the boundary surface and prevents translation of the cutting insert in a first direction along the first seat surface, and the plurality of first engagement elements eccentrically contact the plurality of lower engaging elements and simultaneously prevent translation of the cutting insert in a second direction perpendicular to the first direction along the first seat surface.

Also, in accordance with the present invention, there is provided a square, double-sided cutting insert indexable about a first axis, comprising:

opposing upper and lower surfaces, the upper and lower surfaces each having a square shape in a view thereof along the first axis;

a median plane perpendicular to the first axis and passing midway between the upper and lower surfaces;

an insert bore intersecting the upper and lower surfaces and passing through the median plane, a continuous boundary surface extending between the upper and lower surfaces, the boundary surface having two first peripheral surfaces circumferentially alternating with two second peripheral surfaces via a plurality of corner surfaces;

the upper surface having a pair of diametrically opposite raised corner edges formed at the intersection of upper surface with a first diametrically opposite pair of corner surfaces, and a pair of diametrically opposite lowered corner edges formed at the intersection of the upper surface with a second diametrically opposite pair of corner surfaces, the lower surface having a pair of diametrically opposite lowered corner edges formed at the intersection of lower surface with the first diametrically opposite pair of corner surfaces, and a pair of diametrically opposite raised corner edges formed at the intersection of the lower surface with the second diametrically opposite pair of corner surfaces, a first plane containing the first axis and intersecting the raised corner edges of the upper surface and the lowered corner edges of the lower surface, a second plane containing the first axis and intersecting the lowered corner edges of the upper surface and the raised corner edges of the lower surface;

wherein:

the upper surface is provided with two discrete upper engaging elements, which are formed on inclined portions of the upper surface, spaced apart from one another and also spaced apart from both the insert bore and the boundary surface, the lower surface is provided with two discrete lower engaging elements, which are formed on inclined portions of the lower surface, spaced apart from one another and also spaced apart from both the insert bore and the boundary surface, the first plane intersects the upper engaging elements, but does not intersect the lower engaging elements, the second plane intersects the lower engaging elements, but does not intersect the upper engaging elements; and the cutting insert only has 180° rotational symmetry about the first axis.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

As shown in FIGS. 1 to 4, the present invention relates to a cutting tool 20 comprising a tool body 22 having a first insert receiving pocket 24 and an indexable cutting insert 26 removably mounted therein.

In some embodiments of the present invention, the cutting insert 26 may preferably be manufactured by form pressing and sintering a cemented carbide, such as tungsten carbide, and may be coated or uncoated.

Figure 1:
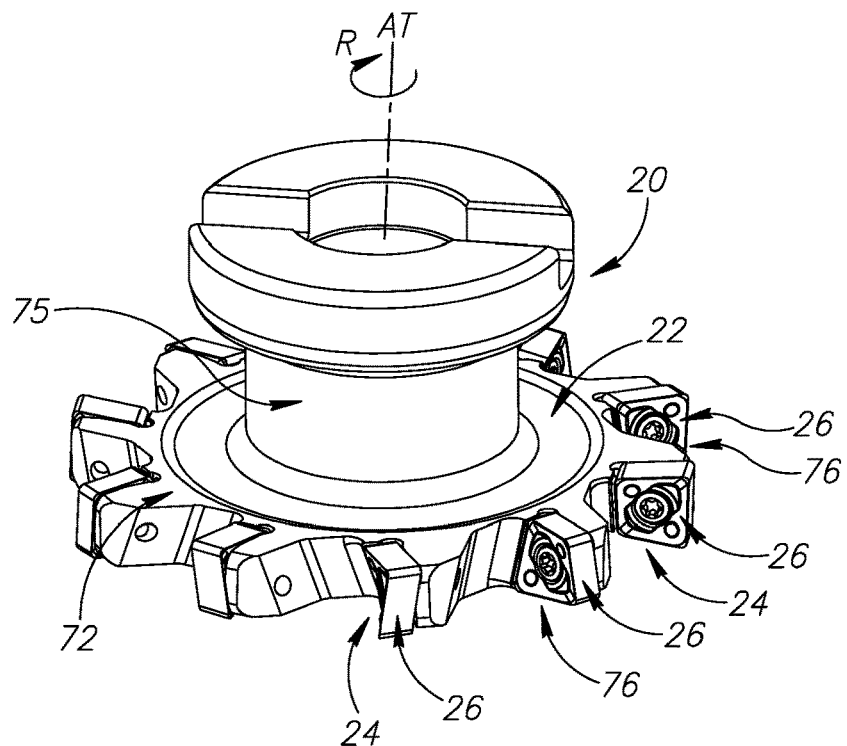
FIG. 1 is a perspective view of a cutting tool in accordance with some embodiments of the present invention.
Figure 2:
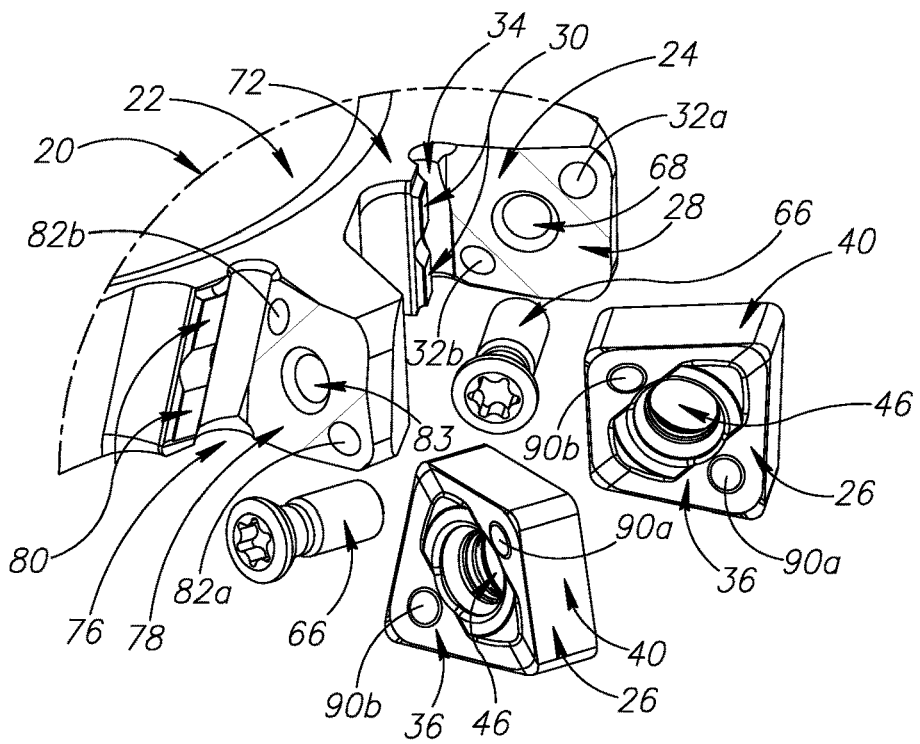
FIG. 2 is a detailed exploded view of the cutting tool shown in FIG. 1.

As shown in FIG. 2, the first insert receiving pocket 24 comprises a first seat surface 28 and a first support wall 30 transverse thereto, the first seat surface 28 having a plurality of male or female first engagement elements 32a, 32b.

In some embodiments of the present invention, each first engagement element 32a, 32b may be partially spherical.

Also, in some embodiments of the present invention, the first seat surface 28 and the first support wall 30 may be spaced apart by a stress relief groove 34.

In other embodiments of the present invention (not shown), the first seat surface 28 may be formed on a shim removably retained in the first insert receiving pocket 24.

Figure 5:
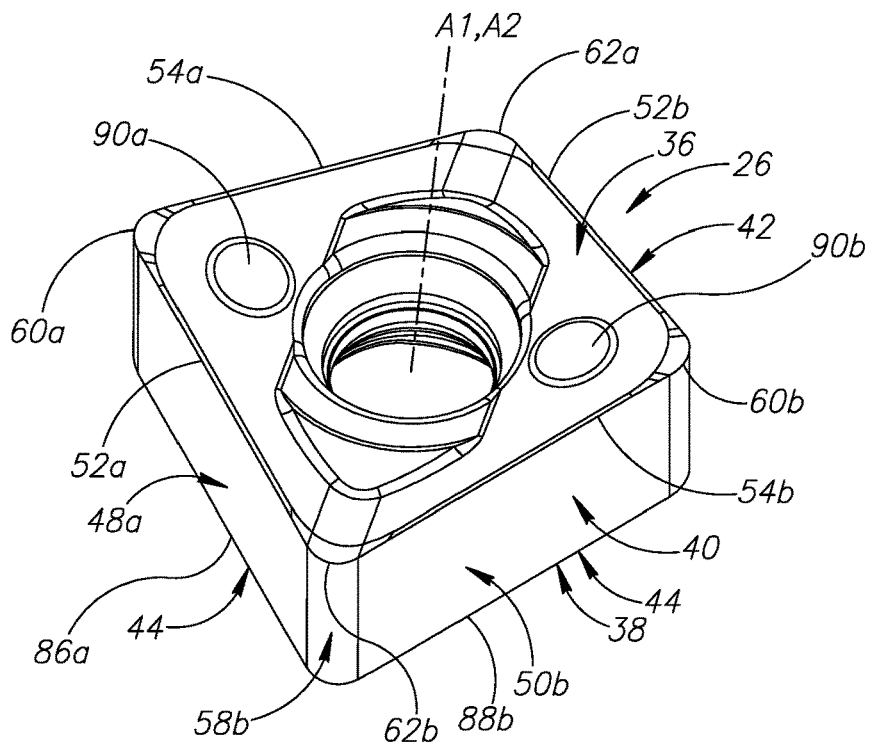
FIG. 5 is a perspective view of a cutting insert in accordance with some embodiments of the present invention.

As shown in FIG. 5, the cutting insert 26 comprises opposing upper and lower surfaces 36, 38 and a continuous boundary surface 40 extending therebetween, and the cutting insert 26 is indexable about a first axis A1 passing through the upper and lower surfaces 36, 38.

In some embodiments of the present invention, the boundary surface 40 may intersect the upper and lower surfaces 36, 38 to form continuous upper and lower boundary edges 42, 44, respectively.

Also, in some embodiments of the present invention, an insert bore 46 may intersect the upper and lower surfaces 36, 38.

Further in some embodiments of the present invention, the insert bore 46 may have a second axis A2 coaxial with the first axis A1.

Figure 6:
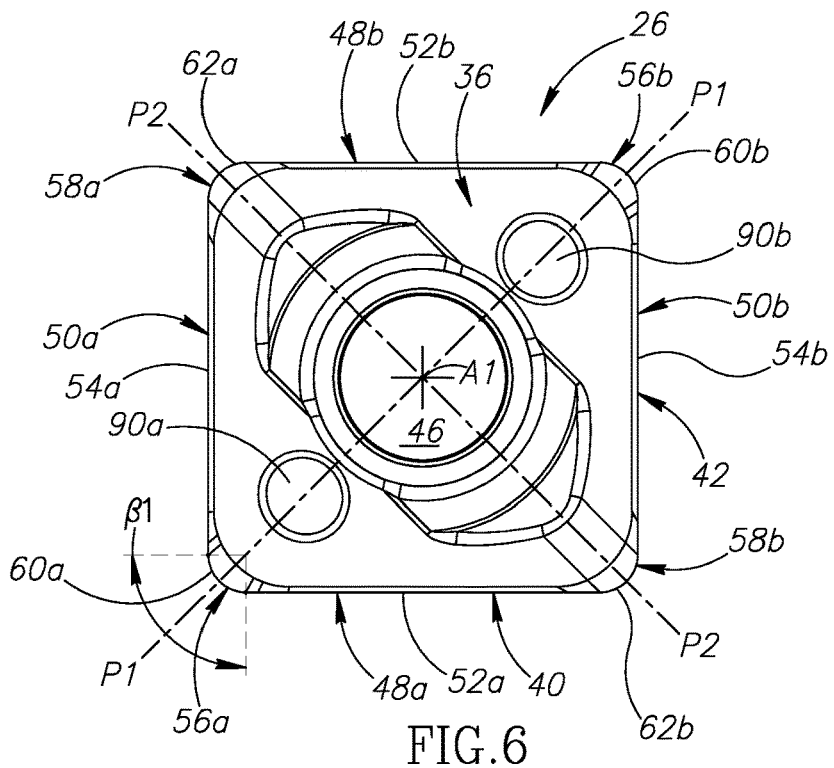
FIG. 6 is a top view of the cutting insert shown in FIG. 5.
Figure 7:
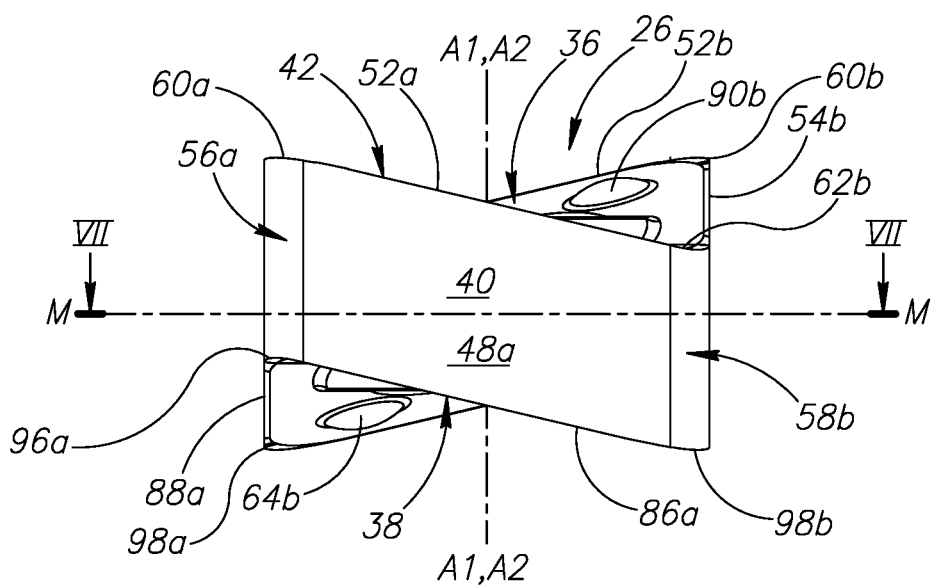
FIG. 7 is a side view of the cutting insert shown in FIG. 5.

As shown in FIGS. 5 to 7, the boundary surface 40 has a plurality of N1 first peripheral surfaces 48a, 48b circumferentially alternating with a plurality of N1 second peripheral surfaces 50a, 50b, each first peripheral surface 48a, 48b intersecting the upper surface 36 to form a first upper cutting edge 52a, 52b, and each second peripheral surface 50a, 50b intersecting the upper surface 36 to form a second upper cutting edge 54a, 54b.

It should be appreciated that the plurality of first and second upper cutting edges 52a, 52b; 54a, 54b are distinct portions of the upper boundary edge 42.

It should also be appreciated that N1 is a whole number greater than one, i.e. N1>1.

In some embodiments of the present invention, N1 may be exactly 2.

Also, in some embodiments of the present invention, in a top view of the cutting insert 26 taken along the first axis A1, as shown in FIG. 6, the plurality of first and second upper cutting edges 52a, 52b; 54a, 54b may be straight.

Further in some embodiments of the present invention, the plurality of first and second peripheral surfaces 48a, 48b; 50a, 50b may be described as flank surfaces.

As shown in FIG. 7, a median plane M perpendicular to the first axis A1 may intersect the boundary surface 40. The insert bore 46 may pass through the median plane M, and the median plane M may pass midway between the upper and lower surfaces 36, 38.

Figure 8:
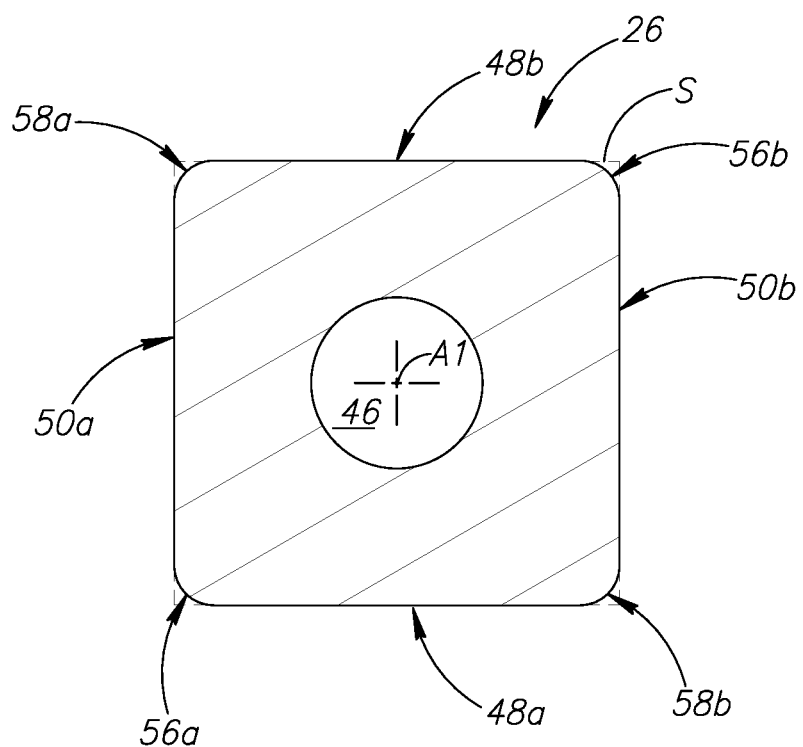
FIG. 8 is a cross-sectional view of the cutting insert shown in FIG. 7, taken along the line VIII-VIII.

In some embodiments of the present invention, as shown in FIG. 8, in a cross-section taken in the median plane M, the cutting insert 26 may exhibit N1*2-fold symmetry about the first axis A1.

Also, in some embodiments of the present invention, as shown in FIG. 8, in the cross-section taken in the median plane M, the plurality of first peripheral surfaces 48a, 48b and the plurality of second peripheral surfaces 50a, 50b may define an imaginary square S.

Further, in some embodiments of the present invention, as shown in FIG. 8, in the cross-section taken in the median plane M, the insert bore 46 may be circular.

For embodiments of the present invention in which the insert bore 46 is circular in the cross-section taken in the median plane M, it should be appreciated that the cutting insert 26 may be configured in a compact size.

As shown in FIGS. 5 to 7, the boundary surface 40 may also include a plurality of N1 third peripheral surfaces 56a, 56b circumferentially alternating with a plurality of N1 fourth peripheral surfaces 58a, 58b, each third peripheral surface 56a, 56b intersecting the upper surface 36 to form a third upper edge 60a, 60b, and each fourth peripheral surface 58a, 58b intersecting the upper surface 36 to form a fourth upper edge 62a, 62b.

As shown in FIG. 6, in the top view of the cutting insert 26 taken along the first axis A1, the third and fourth upper edges 60a, 60b; 62a, 62b may be curved.

In some embodiments of the present invention, each third upper edge 60a, 60b may extend between one of the first upper cutting edges 52a, 52b and one of the second upper cutting edges 54a, 54b, and each fourth upper edge 62a, 62b may extend between one of the first upper cutting edges 52a, 52b and one of the second upper cutting edges 54a, 54b.

As shown in FIG. 6, in the top view of the cutting insert 26 taken along the first axis A1, each curved third and fourth upper edge 60a, 60b; 62a, 62b may subtend a corner angle β1 of 90 degrees.

In some embodiments of the present invention, the plurality of third and fourth peripheral surfaces 56a, 56b; 58a, 58b may be described as corner surfaces, and the plurality of third and fourth upper edges 60a, 60b; 62a, 62b may be described as corner edges.

As shown in FIG. 7, the plurality of fourth upper edges 62a, 62b may be located closer to the median plane M than the plurality of third upper edges 60a, 60b.

In some embodiments of the present invention, the plurality of third upper edges 60a, 60b may be described as diametrically opposite raised corner edges, and the plurality of fourth upper edges 62a, 62b may be described as diametrically opposite lowered corner edges. It is understood that "raised" and "lowered" are defined relative to the median plane M with the raised corner edges being farther from the median plane M than the lowered corner edges.

In a similar manner, the lower surface 38 may also have a pair diametrically opposite lowered corner edges 96a, 96b formed at the intersection of lower surface 38 with the first diametrically opposite pair of corner surfaces 56a, 56b and a pair of diametrically opposite raised corner edges 98a, 98b formed at the intersection of the lower surface 38 with the second diametrically opposite pair of corner surfaces 58a, 58b.

Also, in some embodiments of the present invention, the plurality of third upper edges 60a, 60b may be cutting edges.

Further in some embodiments of the present invention, a first plane P1 containing first axis A1 may intersect the plurality of third upper edges 60a, 60b.

Figure 9:
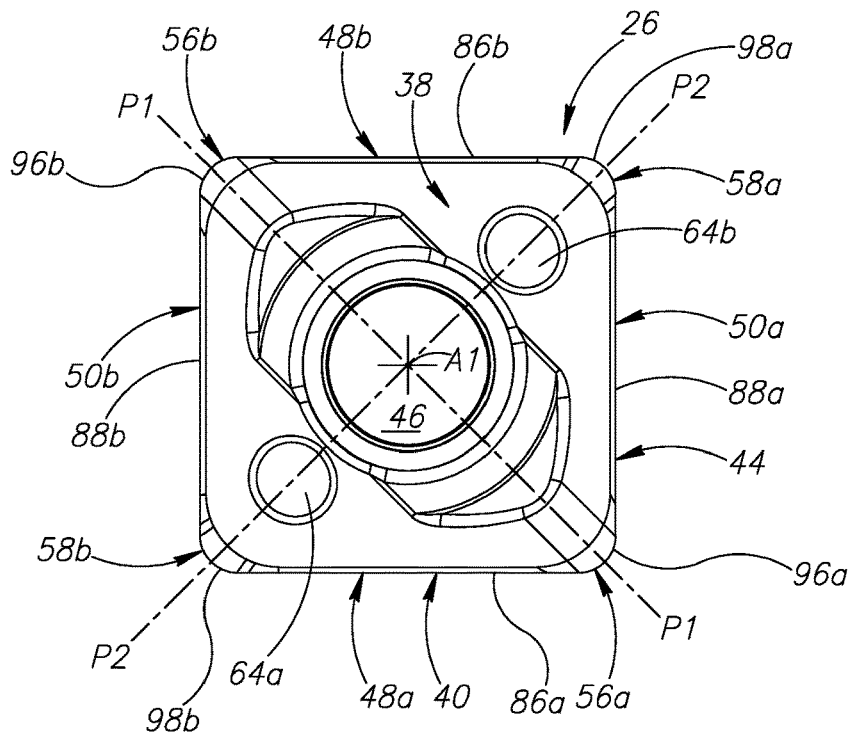
FIG. 9 is a bottom view of the cutting insert shown in FIG. 5.

As shown in FIG. 9, the lower surface 38 has a plurality of discrete, spaced apart female or male lower engaging elements 64a, 64b. The female or male lower engaging elements 64a, 64b may be formed on inclined portions of the lower surface 38, the portions being inclined relative to the median plane M. Additionally, the lower engaging elements 64a, 64b may be spaced apart from both the insert bore 46 and the boundary surface 40.

In some embodiments of the present invention, the lower surface 38 may have a plurality of N1*N2 lower engaging elements 64a, 64b.

It should be appreciated that N2 is a whole number equal to or greater than one, i.e. N2≥1.

Also, in some embodiments of the present invention, N2 may be exactly 1.

As shown in FIG. 9, the first plane P1 may intersect none of the plurality of lower engaging elements 64a, 64b.

In some embodiments of the present invention, the lower surface 38 may exhibit N1*N3-fold rotational symmetry about the first axis A1.

It should be appreciated that N3 is a whole number equal to or greater than one, i.e. N3≥1.

Also, in some embodiments of the present invention, N3 may be exactly 1.

As shown in FIG. 9, a second plane P2 containing first axis A1 and perpendicular to the first plane P1 may intersect at least two of the plurality of lower engaging elements 64a, 64b.

In some embodiments of the present invention, the plurality of first engagement elements 32a, 32b may be equal in number to the plurality of lower engaging elements 64a, 64b.

Also, in some embodiments of the present invention, each lower engaging element 64a, 64b may not intersect the boundary surface 40.

It should be appreciated that in some embodiments of the present invention, each lower engaging element 64a, 64b may be entirely spaced apart from the lower boundary edge 44.

Further in some embodiments of the present invention, each lower engaging element 64a, 64b may be partially spherical.

According to the present invention, the cutting insert 26 has N1 index positions with the lower surface 38 in contact with the first seat surface 28.

Also, according to the present invention, as shown in FIGS. 3, and 10 to 12, in each index position with the lower surface 38 in contact with the first seat surface 28:

the first support wall 30 contacts the boundary surface 40 and prevents translation of the cutting insert 26 in a first direction D1 along the first seat surface 28, and the plurality of first engagement elements 32a, 32b eccentrically contact the plurality of lower engaging elements 64a, 64b and simultaneously prevent translation of the cutting insert 26 in a second direction D2 perpendicular to the first direction D1 along the first seat surface 28.

It should be appreciated that use of the term "eccentric(ally) contact" throughout the description and claims relates to contact between male and female elements having mutually offset center axes (the center axes extending in a direction parallel to the insert's first axis A1) and/or axes of extension (the axis of extension extending in a direction perpendicular to the insert's first axis A1 and along a longest dimension of the male or female element, as the case may be).

It should also be appreciated that the plurality of first engagement elements 32a, 32b do not simultaneously prevent translation of the cutting insert 26 in a third direction D3 opposite to the second direction D2.

In some embodiments of the present invention, in each index position with the lower surface 38 in contact with the first seat surface 28, a clamping member 66 may contact the insert bore 46 and prevent translation of the cutting insert 26 in the third direction D3.

As shown in FIGS. 1 to 4, the clamping member 66 may be a clamping screw extending through the insert bore 46 and threadingly engaging a first seat bore 68 in the first seat surface 28.

In some embodiments of the present invention, the first seat bore 68 may have a third axis A3 non-coaxial with the second axis A2.

Also in some embodiments of the present invention, the clamping member 66 may be a standard clamping screw.

For such embodiments of the present invention, the cutting insert 26 may be removably mounted to the tool body 22 in a simple and cost-effective manner.

Figure 10:
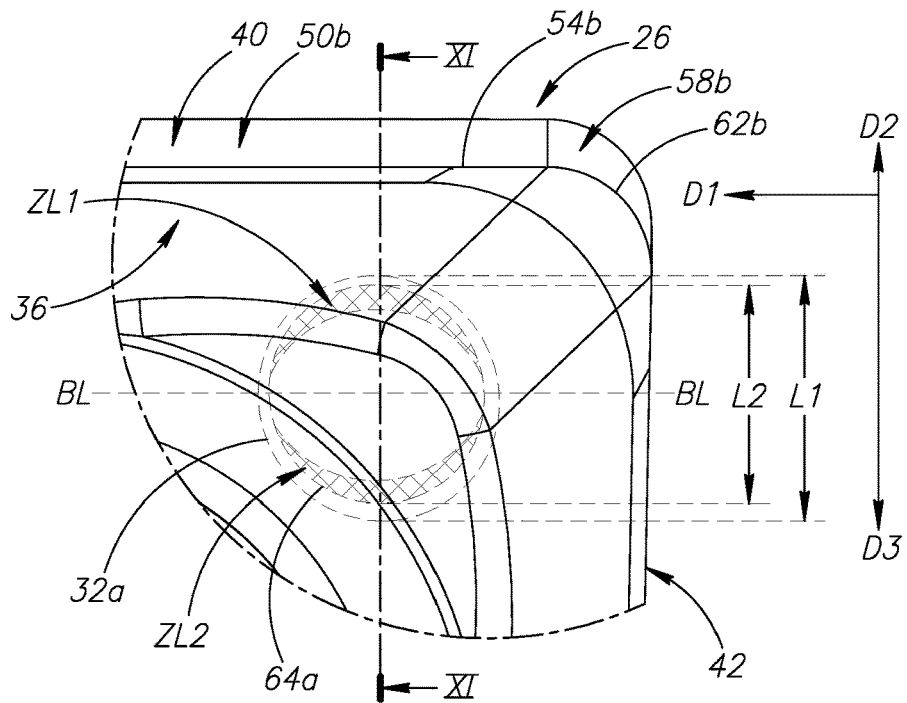
FIG. 10 is a detailed view of the cutting tool shown in FIG. 3, with hidden detail.

As shown in FIG. 10, in each index position with the lower surface 38 in contact with the first seat surface 28, each female first engagement element 32a, 32b or female lower engaging element 64a, 64b has a first length L1 in the second direction D2, and each male lower engaging element 64a, 64b or male first engagement element 32a, 32b has a second length L2 in the second direction D2.

In some embodiments of the present invention, the first length L1 may be greater than the second length L2.

Also, in some embodiments of the present invention, each first engagement element 32a, 32b may be a female recessed element, and each lower engaging element 64a, 64b may be a male protruding element.

It should be appreciated that by providing female first engagement elements 32a, 32b, the first seat surface 28 may be simply and cost-effectively manufactured.

Figure 13:
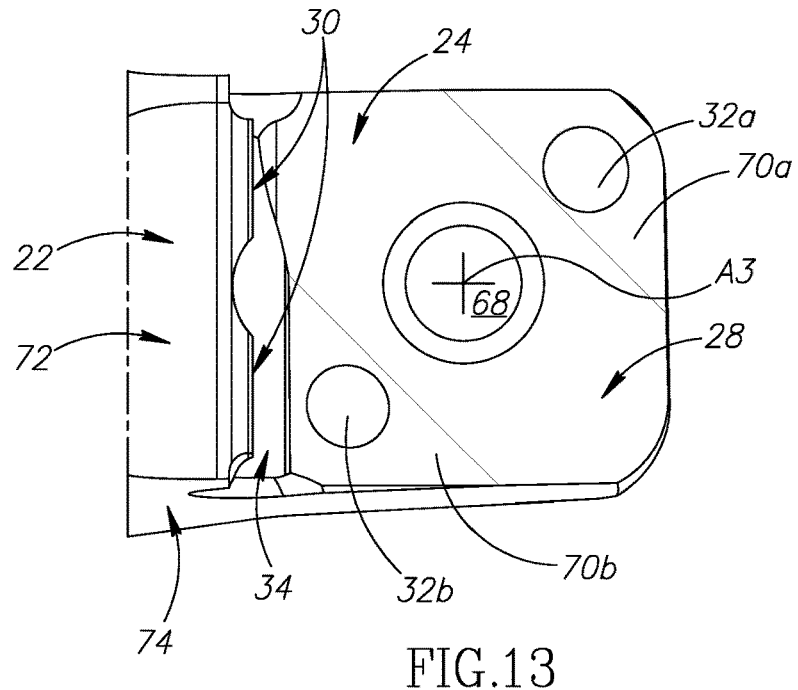
FIG. 13 is a front view of the first insert receiving pocket of the cutting tool shown in FIG. 3, with its cutting insert removed.

As shown in FIG. 13, the first seat surface 28 may have two spaced apart planar first bearing surfaces 70a, 70b.

In some embodiments of the present invention, the two first bearing surfaces 70a, 70b may be mutually inclined. More particularly, the two first bearing surfaces 70a, 70b may lie on planes which meet above the first seat surface 28.

Also, in some embodiments of the present invention, in each index position with the lower surface 38 in contact with the first seat surface 28, the lower surface 38 may contact the two first bearing surfaces 70a, 70b.

Further in some embodiments of the present invention, each of the plurality of first engagement elements 32a, 32b may be at least partially located on one or the other of the two first bearing surfaces 70a, 70b.

Figure 11:
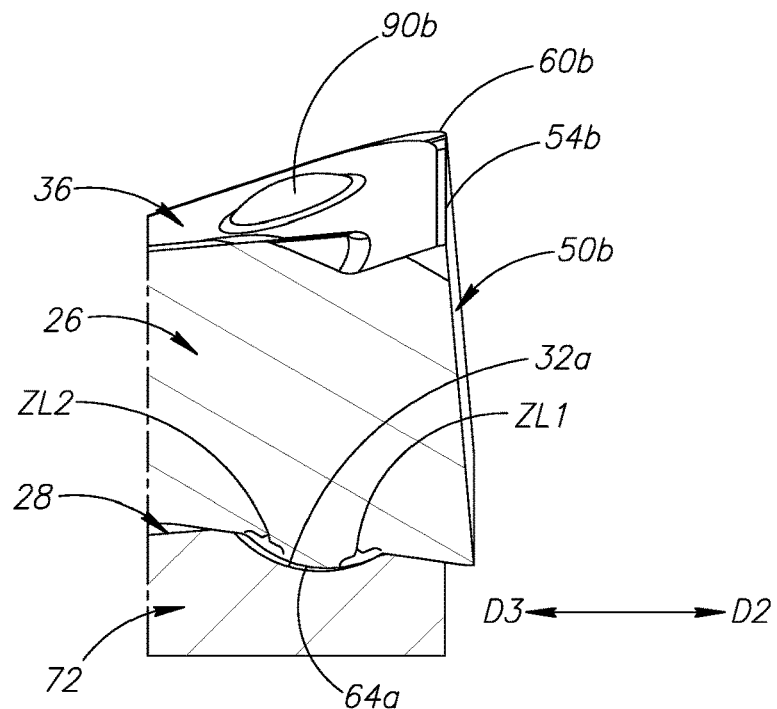
FIG. 11 is a cross-sectional view of the cutting tool shown in FIG. 10, taken along the line XI-XI.

In a first index position with the lower surface 38 in contact with the first seat surface 28, as shown in FIGS. 10 and 11, a first lower contact zone ZL1 of each lower engaging element 64a, 64b is in contact with one of the first engagement elements 32a, 32b.

In a second index position with the lower surface 38 in contact with the first seat surface 28, a second lower contact zone ZL2 of each lower engaging element 64a, 64b is in contact with another one of the first engagement elements 32a, 32b.

Although the second index position is not illustrated in FIGS. 10 and 11, one of the non-operative second lower contact zones ZL2 is shown in FIGS. 10 and 11, spaced apart from its non-associated first engagement element 32a, 32b.

In some embodiments of the present invention, the first and second lower contact zones ZL1, ZL2 of each lower engaging element 64a, 64b may be different from each other.

Also, in some embodiments of the present invention, the first and second lower contact zones ZL1, ZL2 of each lower engaging element 64a, 64b may be non-overlapping and thus spaced apart from each other.

Further, in some embodiments of the present invention, the first and second lower contact zones ZL1, ZL2 of each lower engaging element 64a, 64b may be non-planar.

As shown in FIG. 10, each lower engaging element 64a, 64b has a lower bisector BL, and the first and second lower contact zones ZL1, ZL2 of each lower engaging element 64a, 64b may be entirely located on opposite sides of their respective lower bisector BL.

In some embodiments of the present invention, each lower bisector BL may be parallel to the first direction D1 in both the first and second index positions.

In each index position with the lower surface 38 in contact with the first seat surface 28, only one of the boundary surface's first peripheral surfaces 48a, 48b may be in contact with the first support wall 30, and no other portion of the boundary surface 40 may be in contact with the first insert receiving pocket 24.

Figure 12:
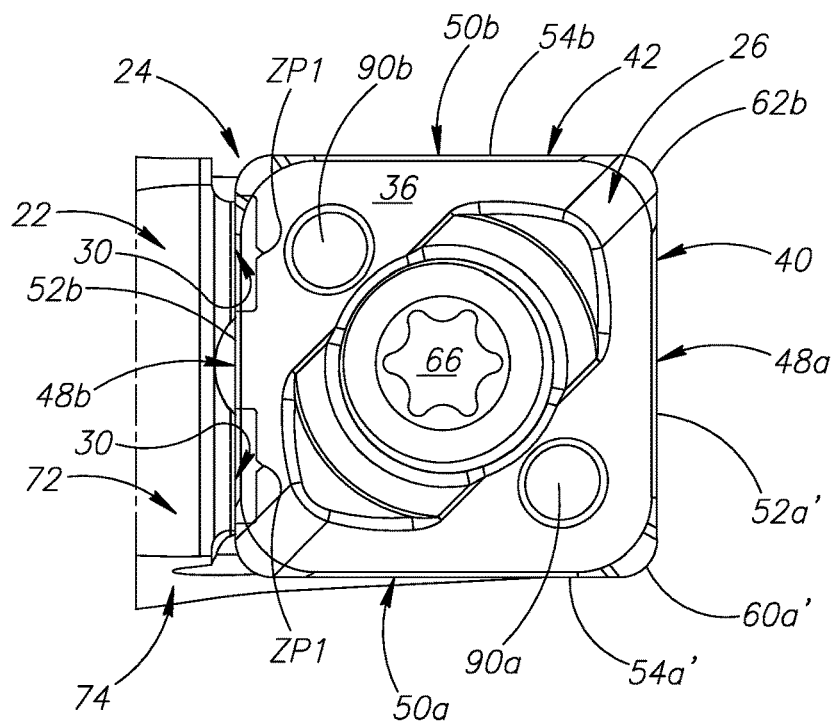
FIG. 12 is a front view of a first insert receiving pocket of the cutting tool shown in FIG. 3, with its cutting insert assembled.

In some embodiments of the present invention, in each index position with the lower surface 38 in contact with the first seat surface 28, as shown in FIG. 12, only a planar first peripheral contact zone ZP1 of one of the boundary surface's first peripheral surfaces 48a, 48b may be in contact with the first support wall 30.

Also, in some embodiments of the present invention, the first peripheral contact zone ZP1 may be parallel to the first axis A1.

It should be appreciated that in some embodiments of the present invention, the first support wall 30 may have two spaced apart support regions, and thus the first peripheral contact zone ZP1 may comprise two spaced apart sub-zones.

Further in some embodiments of the present invention, the entire boundary surface 40 may extend parallel to the first axis A1.

As shown in FIGS. 1 to 4, the cutting tool 20 may be rotatable about a tool axis AT in a direction of rotation R, and the cutting body 22 may have a holder portion 72 in which the cutting insert 26 is removably mounted in the first insert receiving pocket 24, the holder portion 72 having an axially forward facing front end 74.

In some embodiments of the present invention, a shank portion 75 may extend rearwardly from the holder portion 72 along the tool axis AT.

Also, in some embodiments of the present invention, the first direction D1 may be radially inward, and the second direction D2 may be axially rearward.

For such embodiments of the present invention, the third direction D3 may be axially forward, and the first support wall 30 may be described as a radially outward facing first support wall.

Figure 3:
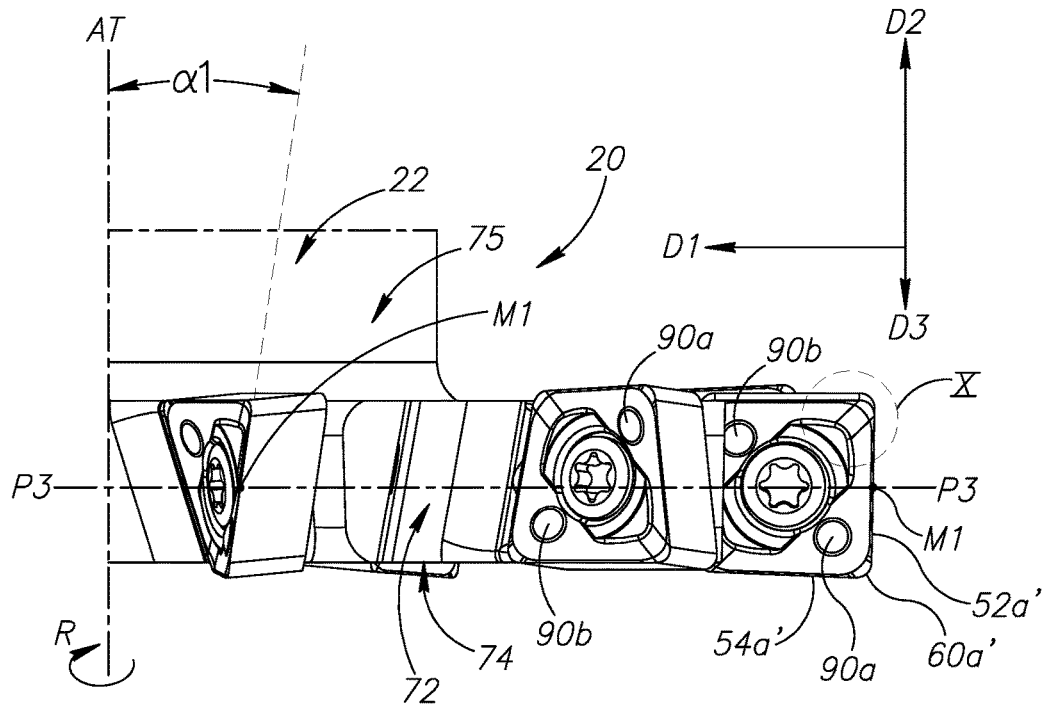
FIG. 3 is a first side view of the cutting tool shown in FIG. 1.

As shown in FIG. 3, a third plane P3 perpendicular to tool axis AT may intersect the first support wall 30 and an operative first upper cutting edge 52a', 52b' of the cutting insert 26 at a first mid-point M1 thereof, and an operative second upper cutting edge 54a', 54b' of the cutting insert 26 may be located axially forward of the third plane P3.

For embodiments of the present invention in which the operative second upper cutting edge 54a', 54b' is located axially forward of the third plane P3, it should be appreciated that the associated axial cutting forces are directed axially rearwardly.

In some embodiments of the present invention, the operative first upper cutting edge 52a', 52b' of the associated cutting insert 26 may have a positive first axial rake angle α1.

Also, in some embodiments of the present invention, an operative third upper edge 60a', 60b' extending between the operative first and second upper cutting edges 52a', 52b'; 54a', 54b' may be located axially forward of the third plane P3.

As shown in FIGS. 1 to 4, the holder portion 72 may have a plurality of circumferentially spaced apart first insert receiving pockets 24, each having a cutting insert 26 removably mounted therein.

In some embodiments of the present invention, the cutting tool 20 may be a slot milling tool.

The present invention is advantageous in that axial support for each cutting insert 26 in its associated first insert receiving pocket 24 is provided by the plurality of first engagement elements 32a, 32b on the first seat surface 28, thus eliminating the need for the first insert receiving pocket 24 to have an axially forward facing support wall, and enabling the slot milling tool, for example, to produce slots having a reduced slot width relative to the insert cutting width.

In some embodiments of the present invention, the holder portion 72 may have a plurality of circumferentially spaced apart second insert receiving pockets 76 circumferentially alternating with the plurality of circumferentially spaced apart first insert receiving pockets 24, the plurality of second insert receiving pockets 76 each having a cutting insert 26 removably mounted therein.

As shown in FIG. 2, each second insert receiving pocket 76 may comprise a second seat surface 78 and a second support wall 80 transverse thereto, the second seat surface 78 may have a plurality of male or female second engagement elements 82a, 82b, and the associated cutting insert 26 may have N1 index positions with the lower surface 38 in contact with the second seat surface 78.

In some embodiments of the present invention, as shown in FIGS. 4, and 14 to 16, in each index position with the associated insert's lower surface 38 in contact with the second seat surface 78:

the second support wall 80 may contact the boundary surface 40 and prevent translation of the cutting insert 26 radially inwardly along the second seat surface 78, and the plurality of second engagement elements 82a, 82b eccentrically contact the plurality of lower engaging elements 64a, 64b and simultaneously prevent translation of the cutting insert 26 axially forwardly along the second seat surface 78.

For such embodiments of the present invention, the second support wall 80 may be described as a radially outward facing second support wall.

In some embodiments of the present invention, each second engagement element 82a, 82b may be a female recessed element.

It should be appreciated that by providing female second engagement elements 82a, 82b, the second seat surface 78 may be simply and cost-effectively manufactured.

In some embodiments of the present invention, in each index position with the associated insert's lower surface 38 in contact with the second seat surface 78, an associated clamping screw 66 may contact the insert bore 46 and prevent translation of the cutting insert 26 axially rearwardly.

As shown in FIGS. 1 to 4, the clamping screw 66 may extend through the insert bore 46 and threadingly engage a second seat bore 83 in the second seat surface 78.

Figure 17:
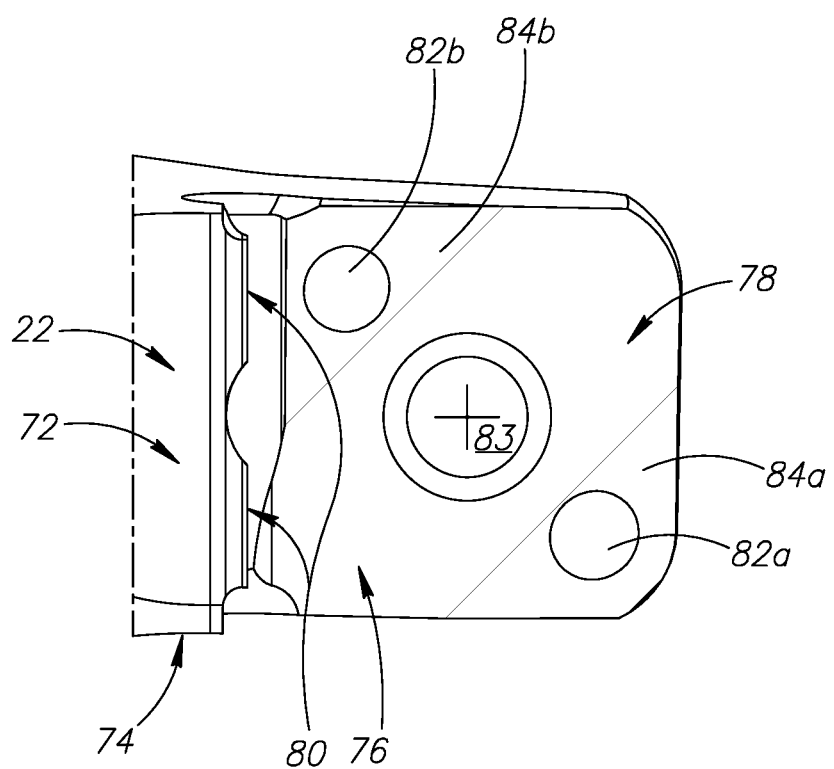
FIG. 17 is a front view of the second insert receiving pocket of the cutting tool shown in FIG. 4, with its cutting insert removed.

As shown in FIG. 17, the second seat surface 78 may have two spaced apart planar second bearing surfaces 84a, 84b.

In some embodiments of the present invention, the two second bearing surfaces 84a, 84b may be mutually inclined. More particularly, the two second bearing surfaces 84a, 84b may lie on planes which meet above the second seat surface 78.

Also, in some embodiments of the present invention, in each index position with the associated insert's lower surface 38 in contact with the second seat surface 78, the lower surface 38 may contact the two second bearing surfaces 84a, 84b.

Further in some embodiments of the present invention, each of the plurality of second engagement elements 82a, 82b may be at least partially located on one or the other of the two second bearing surfaces 84a, 84b.

Figure 14:
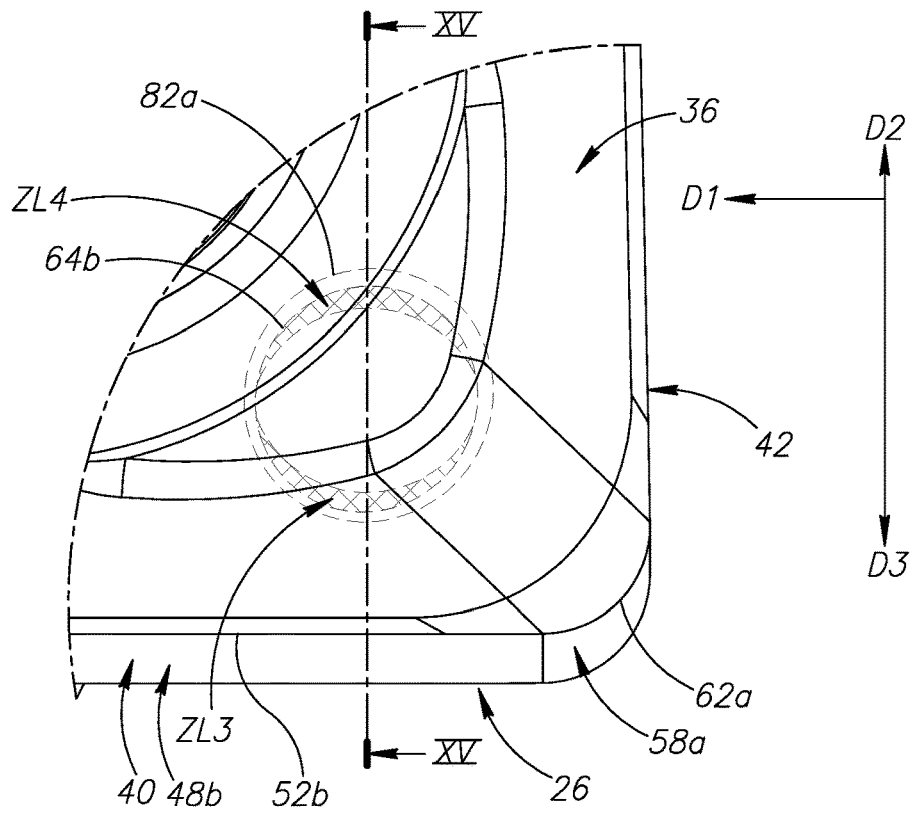
FIG. 14 is a detailed view of the cutting tool shown in FIG. 4, with hidden detail.
Figure 15:
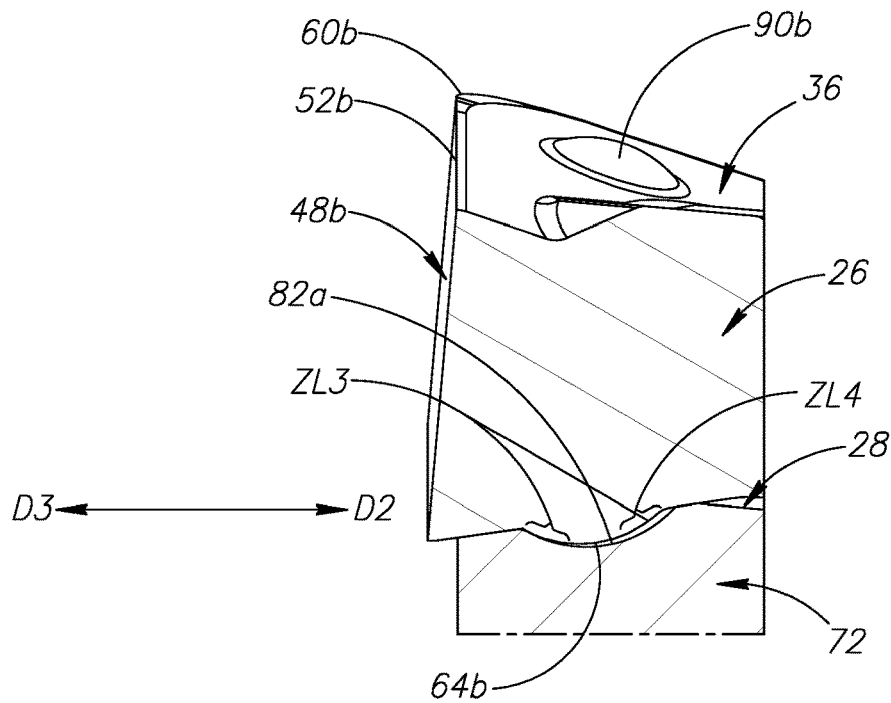
FIG. 15 is a cross-sectional view of the cutting tool shown in FIG. 14, taken along the line XV-XV.

In a first index position with the associated insert's lower surface 38 in contact with the second seat surface 78, as shown in FIGS. 14 and 15, a third lower contact zone ZL3 of each lower engaging element 64a, 64b is in contact with one of the second engagement elements 82a, 82b.

In a second index position with the associated insert's lower surface 38 in contact with the second seat surface 78, a fourth lower contact zone ZL4 of each lower engaging element 64a, 64b is in contact with another one of the second engagement elements 82a, 82b.

Although the second index position is not illustrated in FIGS. 14 and 15, one of the non-operative fourth lower contact zones ZL4 is shown in FIGS. 14 and 15, spaced apart from its non-associated second engagement element 82a, 82b.

In some embodiments of the present invention, the third and fourth lower contact zones ZL3, ZL4 of each lower engaging element 64a, 64b may be different from each other.

Also, in some embodiments of the present invention, the third and fourth lower contact zones ZL3, ZL4 of each lower engaging element 64a, 64b may be non-overlapping and thus spaced apart from each other.

Further, in some embodiments of the present invention, the third and fourth lower contact zones ZL3, ZL4 of each lower engaging element 64a, 64b may be non-planar.

It should be also appreciated that in some embodiments of the present invention, although there may be some overlap, the third and fourth lower contact zones ZL3, ZL4 of each lower engaging element 64a, 64b may not be coincident with the first and second lower contact zones ZL1, ZL2 of the same lower engaging element 64a, 64b.

In each index position with the associated insert's lower surface 38 in contact with the second seat surface 78, only one of the second peripheral surfaces 50a, 50b may be in contact with the second support wall 80, and no other portion of the boundary surface 40 may be in contact with the second insert receiving pocket 76.

Figure 16:
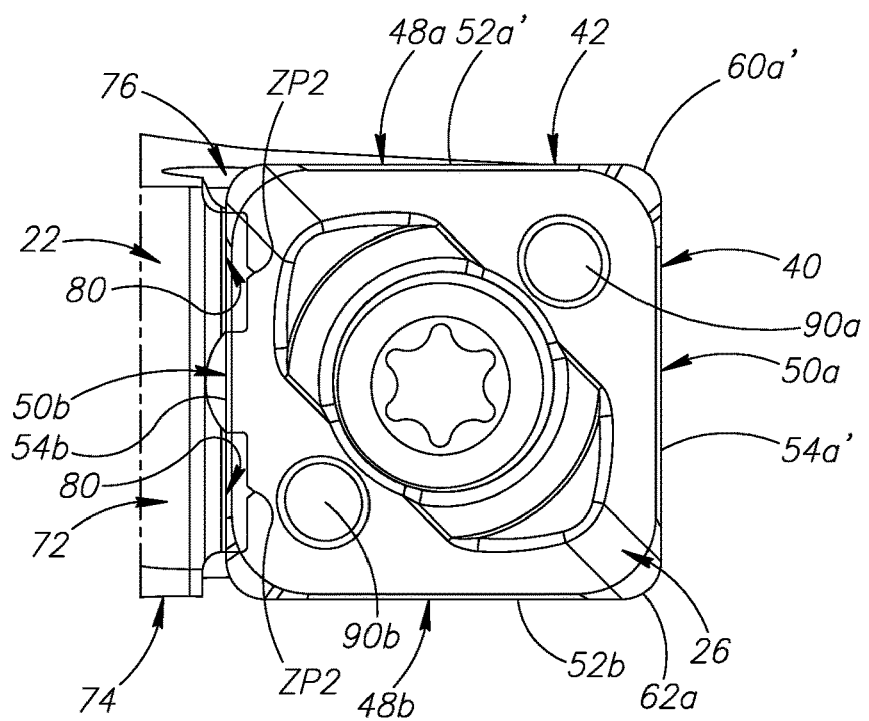
FIG. 16 is a front view of a second insert receiving pocket of the cutting tool shown in FIG. 4, with its cutting insert assembled.

In some embodiments of the present invention, in each index position with the associated insert's lower surface 38 in contact with the second seat surface 78, as shown in FIG. 16, only a planar second peripheral contact zone ZP2 of one of the boundary surface's second peripheral surfaces 50a, 50b may be in contact with the second support wall 80.

Also, in some embodiments of the present invention, the second peripheral contact zone ZP2 may be parallel to the first axis A1.

It should be appreciated that in some embodiments of the present invention, the second support wall 80 may have two spaced apart support regions, and thus the second peripheral contact zone ZP2 may comprise two spaced apart sub-zones.

Figure 4:
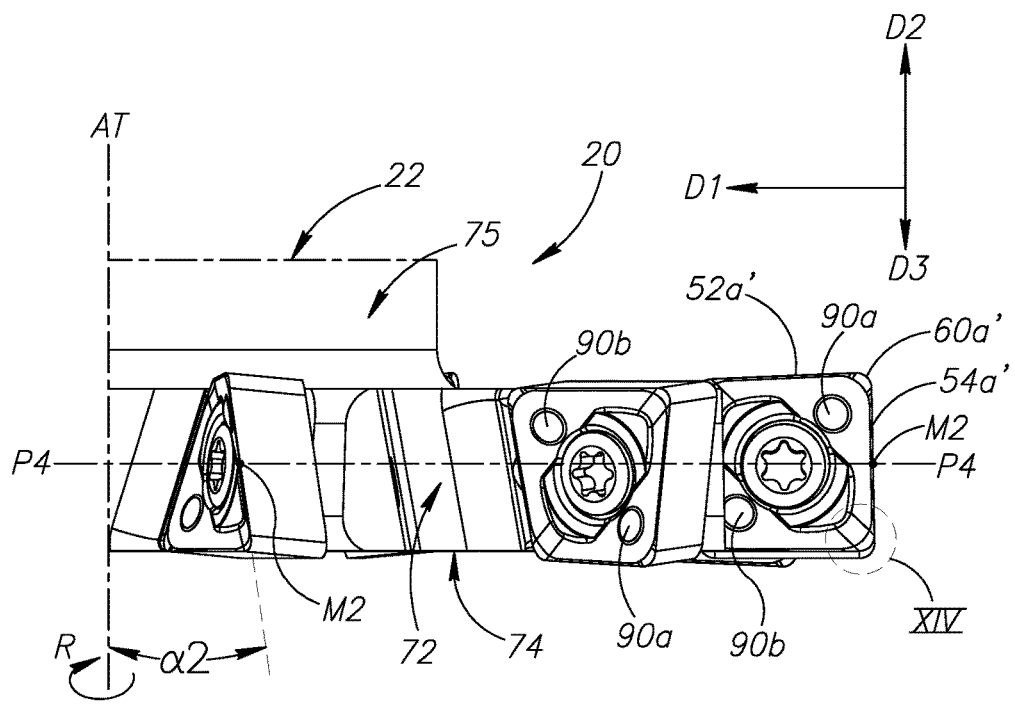
FIG. 4 is a second side view of the cutting tool shown in FIG. 1.

As shown in FIG. 4, a fourth plane P4 perpendicular to the tool axis AT may intersect one of the second support walls 80 and an operative second upper cutting edge 54a', 54b' of the associated cutting insert 26 at a second mid-point M2 thereof, and an operative first upper cutting edge 52a', 52b' of the associated cutting insert 26 may be located axially rearward of the fourth plane P4.

For embodiments of the present invention in which the operative first upper cutting edge 52a', 52b' is located axially rearward of the fourth plane P4, it should be appreciated that the associated axial cutting forces are directed axially forwardly.

In some embodiments of the present invention, the operative second upper cutting edge 54a', 54b' of the associated cutting insert 26 may have a negative second axial rake angle α2.

Also, in some embodiments of the present invention, the fourth plane P4 may be offset axially rearwardly from the third plane P3.

The present invention is advantageous in that axial support for each cutting insert 26 in its associated second insert receiving pocket 76 is provided by the plurality of second engagement elements 82a, 82b on the second seat surface 78, thus eliminating the need for the second insert receiving pocket 76 to have an axially rearward facing support wall, and enabling the slot milling tool, for example, to produce slots having a reduced slot width relative to the cutting width of the indexable cutting inserts 26.

As shown in FIGS. 5 to 7, and 9, each first peripheral surface 48a, 48b may intersect the lower surface 38 to form a first lower cutting edge 86a, 86b, and each second peripheral surface 50a, 50b may intersect the lower surface 38 to form a second lower cutting edge 88a, 88b.

It should be appreciated that the plurality of first and second lower cutting edges 86a, 86b; 88a, 88b may be distinct portions of the lower boundary edge 44.

As shown in FIG. 6, the upper surface 36 may have a plurality of discrete, spaced apart female or male upper engaging elements 90a, 90b. The female or male upper engaging elements 90a, 90b may be formed on inclined portions of the upper surface 36, the portions being inclined relative to the median plane M. Additionally, the upper engaging elements 90a, 90b may be spaced apart from both the insert bore 46 and the boundary surface 40.

In some embodiments of the present invention, the upper surface 36 may have exactly two upper engaging elements 90a, 90b.

Also, in some embodiments of the present invention, each upper engaging element 90a, 90b may not intersect the boundary surface 40.

It should be appreciated that in some embodiments of the present invention, each upper engaging element 90a, 90b may be entirely spaced apart from the upper boundary edge 42.

As shown in FIGS. 5 to 7, each upper engaging element 90a, 90b may be a male protruding element.

In some embodiments of the present invention, each upper engaging element 90a, 90b may be partially spherical.

Also, in some embodiments of the present invention, the upper and lower surfaces 36, 38 may be identical. In such case, the cutting insert 26 can be considered "reversible" or "double-sided". Furthermore, although the upper and lower surfaces 36, 38 of the double-sided cutting insert 26 seen in the figures have a square shape in a view along the first axis A1, the cutting insert is only two-way indexable on each side, i.e., it only has 180° rotational symmetry on each side.

As shown in FIG. 6, the first plane P1 may intersect at least two of the plurality of female or male upper engaging elements 90a, 90b, and the second plane P2 may intersect none of the plurality of female or male upper engaging elements 90a, 90b.

It should be appreciated that in each index position of one of the cutting inserts 26 with its lower surface 38 in contact with one of the first seat surfaces 28, at least one of the plurality of upper engaging elements 90a, 90b intersected by the first plane P1 and located axially forward of the third plane P3 may advantageously deflect cutting chips formed by the operative first, second and third upper cutting edges 52a', 52b'; 54a', 54b'; 60a', 60b'.

It should also be appreciated that each cutting insert 26 may have N1 index positions with its upper surface 36 in contact with one of the first seat surfaces 28, and in each index position:

the first support wall 30 may contact the boundary surface 40 and prevent translation of the cutting insert 26 in the first direction D1 along the first seat surface 28, and the plurality of first engagement elements 32a, 32b may eccentrically contact the plurality of upper engaging elements 90a, 90b and simultaneously prevent translation of the cutting insert 26 in the second direction D2 along the first seat surface 28.

In some embodiments of the present invention, in each index position with the upper surface 36 in contact with the first seat surface 28, only the planar first peripheral contact zone ZP1 of one of the boundary surface's first peripheral surfaces 48a, 48b may be in contact with the first support wall 30.

It should also be appreciated that each cutting insert 26 may have N1 index positions with its upper surface 36 in contact with one of the second seat surfaces 78.

For embodiments of the present invention in which N1=2, it should be appreciated that each cutting insert 26 may advantageously have a total of 8 mounting positions on the tool body 22, made up of four mounting positions associated with one of the first insert receiving pockets 24, and four more mounting positions associated with one of the second insert receiving pockets 76.

Although the present invention has been described to a certain degree of particularity, it should be understood that various alterations and modifications could be made without departing from the spirit or scope of the invention as hereinafter claimed.

What is claimed is:

1. A cutting tool (20) comprising a tool body (22) having a first insert receiving pocket (24) and an indexable cutting insert (26) removably mounted therein:

the first insert receiving pocket (24) comprising a first seat surface (28) and a first support wall (30) transverse thereto, the first seat surface (28) having a plurality of male or female first engagement elements (32a, 32b); and the cutting insert (26) comprising opposing upper and lower surfaces (36, 38) and a continuous boundary surface (40) extending therebetween, the boundary surface (40) having a plurality of N1 first peripheral surfaces (48a, 48b) circumferentially alternating with a plurality of N1 second peripheral surfaces (50a, 50b), each first peripheral surface (48a, 48b) intersecting the upper surface (36) to form a first upper cutting edge (52a, 52b), and each second peripheral surface (50a, 50b) intersecting the upper surface (36) to form a second upper cutting edge (54a, 54b), and the lower surface (38) having a plurality of discrete, spaced apart female or male lower engaging elements (64a, 64b), wherein the cutting insert (26) is indexable about a first axis (A1) passing through the upper and lower surfaces (36, 38), and a median plane (M) perpendicular to the first axis (A1) intersects the boundary surface (40), wherein the cutting insert (26) has N1 index positions with the lower surface (38) in contact with the first seat surface (28), and in each index position:

the first support wall (30) contacts the boundary surface (40) and prevents translation of the cutting insert (26) in a first direction (D1) along the first seat surface (28), and the plurality of first engagement elements (32a, 32b) eccentrically contact the plurality of lower engaging elements (64a, 64b) and simultaneously prevent translation of the cutting insert (26) in a second direction (D2) perpendicular to the first direction (D1) along the first seat surface (28).

2. The cutting tool (20) according to claim 1, wherein in each index position:
each female first engagement element (32a, 32b) or female lower engaging element (64a, 64b) has a first length (L1) in the second direction (D2), and
each male lower engaging element (64a, 64b) or male first engagement element (32a, 32b) has a second length (L2) in the second direction (D2),
and wherein:
the first length (L1) is greater than the second length (L2).

3. The cutting tool (20) according to claim 1, wherein:
each lower engaging element (64a, 64b) is a male protruding element, and
each first engagement element (32a, 32b) is a female recessed element.

4. The cutting tool (20) according to claim 1, wherein:
the plurality of first engagement elements (32a, 32b) are not configured to simultaneously prevent translation of the cutting insert (26) in a third direction (D3) opposite to the second direction (D2).

5. The cutting tool (20) according to claim 1, wherein:
each lower engaging element (64a, 64b) is spaced apart from, and does not intersect the boundary surface (40).

6. The cutting tool (20) according to claim 1, wherein in each index position with the lower surface (38) in contact with the first seat surface (28):
only one of the first peripheral surfaces (48a, 48b) is in contact with the first support wall (30), and
no other portion of the boundary surface (40) is in contact with the first insert receiving pocket (24).

7. The cutting tool (20) according to claim 1, wherein:
in a first index position with the lower surface (38) in contact with the first seat surface (28), a first lower contact zone (ZL1) of each lower engaging element (64a, 64b) is in contact with one of the first engagement elements (32a, 32b),
in a second index position with the lower surface (38) in contact with the first seat surface (28), a second lower contact zone (ZL2) of each lower engaging element (64a, 64b) is in contact with another one of the first engagement elements (32a, 32b), and
wherein the first and second lower contact zones (ZL1, ZL2) of each lower engaging element (64a, 64b) are different from each other.

8. The cutting tool (20) according to claim 7, wherein the first and second lower contact zones (ZL1, ZL2) of each lower engaging element (64a, 64b) are spaced apart from each other.

9. The cutting tool (20) according to claim 7, wherein the first and second lower contact zones (ZL1, ZL2) of each lower engaging element (64a, 64b) are non-planar.

10. The cutting tool (20) according to claim 7, wherein:
each lower engaging element (64a, 64b) has a lower bisector (BL), and
the first and second lower contact zones (ZL1, ZL2) of each lower engaging element (64a, 64b) are entirely located on opposite sides of their respective lower bisector (BL).

11. The cutting tool (20) according to claim 10, wherein each lower bisector (BL) is parallel to the first direction (D1) in both the first and second index positions.

12. The cutting tool (20) according to claim 1, wherein:
the cutting tool (20) is rotatable about a tool axis (AT) in a direction of rotation (R), and
the cutting body (22) has a holder portion (72) in which the cutting insert (26) is removably mounted in the first insert receiving pocket (24), the holder portion (72) having an axially forward facing front end (74),
and wherein:
the first direction (D1) is radially inward, and
the second direction (D2) is axially rearward.

13. The cutting tool (20) according to claim 12, wherein:
the cutting tool (20) is a slot milling tool.

14. The cutting tool (20) according to claim 12, wherein:
a third plane (P3) perpendicular to tool axis (AT) intersects the first support wall (30) and an operative first upper cutting edge (52a', 52b') of the cutting insert (26) at a first mid-point (M1) thereof, and
an operative second upper cutting edge (54a', 54b') of the cutting insert (26) is located axially forward of the third plane (P3).

15. The cutting tool (20) according to claim 12, wherein:
the holder portion (72) has a plurality of circumferentially spaced apart first insert receiving pockets (24) with a cutting insert (26) removably mounted in each of the first insert receiving pockets (24).

16. The cutting tool (20) according to claim 15, wherein:
the holder portion (72) has a plurality of circumferentially spaced apart second insert receiving pockets (76) circumferentially alternating with the plurality of circumferentially spaced apart first insert receiving pockets (24),
each second insert receiving pocket (76) comprising a second seat surface (78) and a second support wall (80) transverse thereto, the second seat surface (78) having a plurality of male or female second engagement elements (82a, 82b),
a cutting insert (26) is removably mounted in each of the second insert receiving pockets (76), and
each cutting insert (26) has N1 index positions with its lower surface (38) in contact with the associated second seat surface (78), and in each index position:
the second support wall (80) contacts the boundary surface (40) and prevents translation of the cutting insert (26) radially inwardly along the second seat surface (78), and
the plurality of second engagement elements (82a, 82b) eccentrically contact the plurality of lower engaging elements (64a, 64b) and simultaneously prevent translation of the cutting insert (26) axially forwardly along the second seat surface (78).

17. The cutting tool (20) according to claim 16, wherein:
a fourth plane (P4) perpendicular to the tool axis (AT) intersects one of the second support walls (80) and an operative second upper cutting edge (54a', 54b') of the associated cutting insert (26) at a second mid-point (M2) thereof, and
an operative first upper cutting edge (52a', 52b') of the associated cutting insert (26) is located axially rearward of the fourth plane (P4).

18. The cutting tool (20) according to claim 1, wherein:
each first peripheral surface (48a, 48b) intersects the lower surface (38) to form a first lower cutting edge (86a, 86b), each second peripheral surface (50a, 50b) intersects the lower surface (38) to form a second lower cutting edge (88a, 88b), and the upper surface (36) has a plurality of discrete, spaced apart female or male upper engaging elements (90a, 90b),
the cutting insert (26) has N1 index positions with the upper surface (36) in contact with the first seat surface (28), and wherein in each index position:

the first support wall (30) contacts the boundary surface (40) and prevents translation of the cutting insert (26) in the first direction (D1) along the first seat surface (28), and the plurality of first engagement elements (32a, 32b) eccentrically contact the plurality of upper engaging elements (90a, 90b) and simultaneously prevent translation of the cutting insert (26) in the second direction (D2) along the first seat surface (28).

19. The cutting tool (20) according to claim 18, wherein the upper and lower surfaces (36, 38) are identical.

20. The cutting tool (20) according to claim 1, wherein in a cross-section taken in the median plane (M), the cutting insert (26) exhibits N1*2-fold symmetry about the first axis (A1).

21. The cutting tool (20) according to claim 20, wherein in the cross-section taken in the median plane (M), the plurality of first peripheral surfaces (48a, 48b) and the plurality of second peripheral surfaces (50a, 50b) define an imaginary square (S).

22. The cutting tool (20) according to claim 1, wherein:
the boundary surface (40) includes a plurality of N1 third peripheral surfaces (56a, 56b) circumferentially alternating with a plurality of N1 fourth peripheral surfaces (58a, 58b),
each third peripheral surface (56a, 56b) intersects the upper surface (36) to form a third upper edge (60a, 60b), and each fourth peripheral surface (58a, 58b) intersects the upper surface (36) to form a fourth upper edge (62a, 62b), and
in a top view of the cutting insert (26) taken along the first axis (A1), the third and fourth upper edges (60a, 60b; 62a, 62b) are curved.

23. The cutting tool (20) according to claim 22, wherein the plurality of fourth upper edges (62a, 62b) are located closer to the median plane (M) than the plurality of third upper edges (60a, 60b).

24. The cutting tool (20) according to claim 22, wherein a first plane (P1) containing first axis (A1) intersects the plurality of third upper edges (60a, 60b) and none of the plurality of lower engaging elements (64a, 64b).

25. The cutting tool (20) according to claim 24, wherein a second plane (P2) containing first axis (A1) and perpendicular to the first plane (P1) intersects at least two of the lower engaging elements (64a, 64b).

26. The cutting tool (20) according to claim 1, wherein the cutting insert (26) further comprises an insert bore (46) intersecting the upper and lower surfaces (36, 38).

27. A square, double-sided cutting insert (26) indexable about a first axis (A1), comprising:
opposing upper and lower surfaces (36, 38), the upper and lower surfaces (36, 38) each having a square shape in a view thereof along the first axis (A1);
a median plane (M) perpendicular to the first axis (A1) and passing midway between the upper and lower surfaces (36, 38);
an insert bore (46) intersecting the upper and lower surfaces (36, 38) and passing through the median plane (M),
a continuous boundary surface (40) extending between the upper and lower surfaces (36, 38), the boundary surface (40) having two first peripheral surfaces (48a, 48b) circumferentially alternating with two second peripheral surfaces (50a, 50b) via a plurality of corner surfaces (56a, 56b; 58a, 58b);
the upper surface (36) having a pair of diametrically opposite raised corner edges (60a, 60b) formed at the intersection of upper surface (36) with a first diametrically opposite pair of corner surfaces (56a, 56b), and a pair of diametrically opposite lowered corner edges (62a, 62b) formed at the intersection of the upper surface (36) with a second diametrically opposite pair of corner surfaces (58a, 58b),
the lower surface (38) having a pair of diametrically opposite lowered corner edges (96a, 96b) formed at the intersection of lower surface (38) with the first diametrically opposite pair of corner surfaces (56a, 56b), and a pair of diametrically opposite raised corner edges (98a, 98b) formed at the intersection of the lower surface (38) with the second diametrically opposite pair of corner surfaces (58a, 58b),
a first plane (P1) containing the first axis (A1) and intersecting the raised corner edges (60a, 60b) of the upper surface (36) and the lowered corner edges (96a, 96b) of the lower surface (38),
a second plane (P2) containing the first axis (A1) and intersecting the lowered corner edges (62a, 62b) of the upper surface (36) and the raised corner edges (98a, 98b) of the lower surface (38);
wherein:
the upper surface (36) is provided with two discrete upper engaging elements (90a, 90b), which are formed on inclined portions of the upper surface (36), spaced apart from one another, and also spaced apart from both the insert bore (46) and the boundary surface (40),
the lower surface (38) is provided with two discrete lower engaging elements (64a, 64b), which are formed on inclined portions of the lower surface (38), spaced apart from one another, and also spaced apart from both the insert bore (46) and the boundary surface (40),
the first plane (P1) intersects the upper engaging elements (90a, 90b), but does not intersect the lower engaging elements (64a, 64b),
the second plane (P2) intersects the lower engaging elements (64a, 64b), but does not intersect the upper engaging elements (90a, 90b); and
the cutting insert (26) only has 180° rotational symmetry about the first axis (A1).

28. A cutting tool (20) comprising:
a first insert receiving pocket (24) comprising a first seat surface (28) and a first support wall (30) transverse thereto, the first seat surface (28) having a plurality of first engagement elements (32a, 32b); and
a cutting insert (26) in accordance with claim 27 removably mounted in the first insert receiving pocket (24), wherein:
the first support wall (30) contacts the boundary surface (40) and prevents translation of the cutting insert (26) in a first direction (D1) along the first seat surface (28), and
the plurality of first engagement elements (32a, 32b) eccentrically contact the plurality of lower engaging elements (64a, 64b) and simultaneously prevent translation of the cutting insert (26) in a second direction (D2) perpendicular to the first direction (D1) along the first seat surface (28).

* * * * *